May 2, 1944.　　　S. SCHNELL　　　2,347,847
FLUID PRESSURE CONTROL SYSTEM
Filed Jan. 14, 1942　　　2 Sheets-Sheet 1
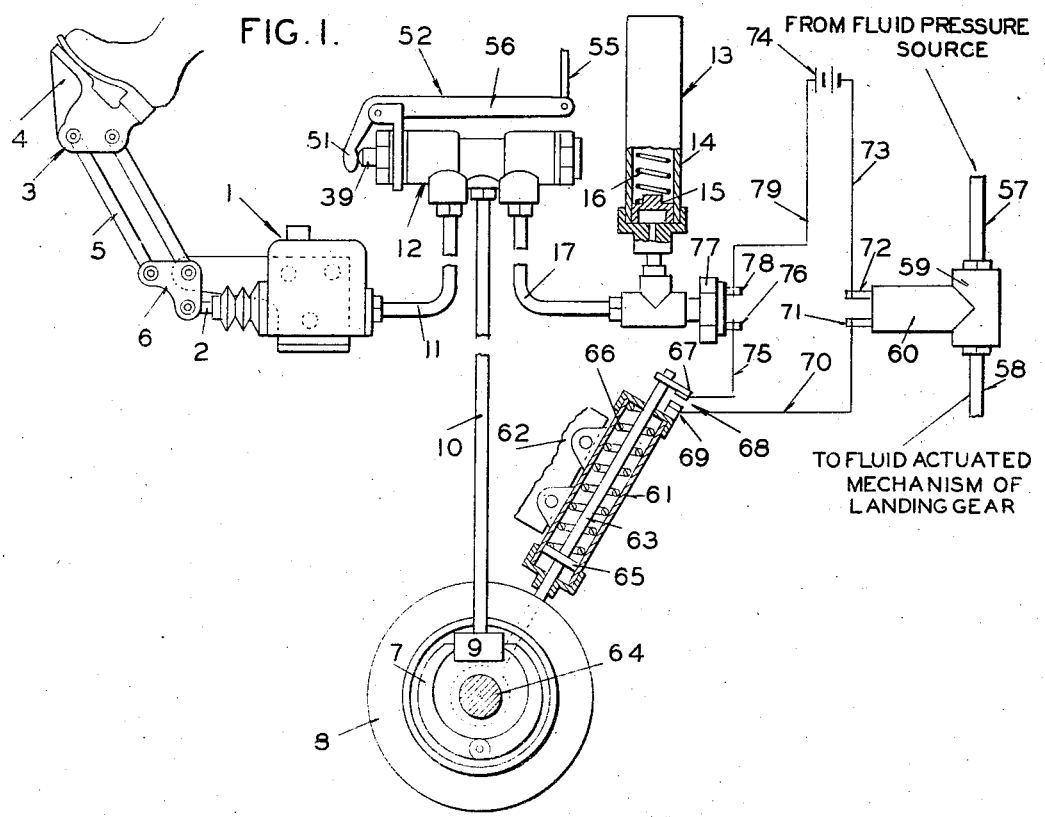
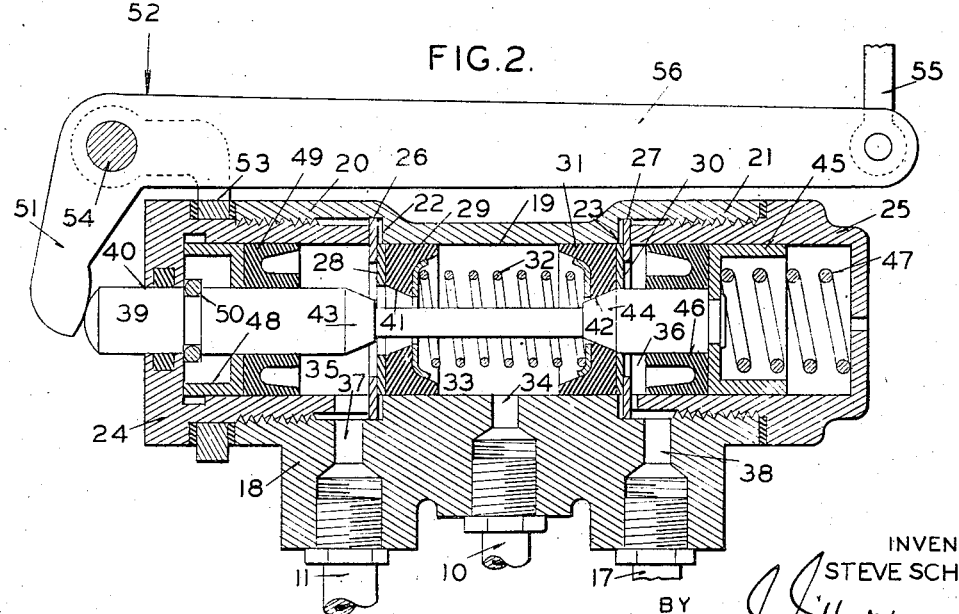
INVENTOR
STEVE SCHNELL
BY
ATTORNEY

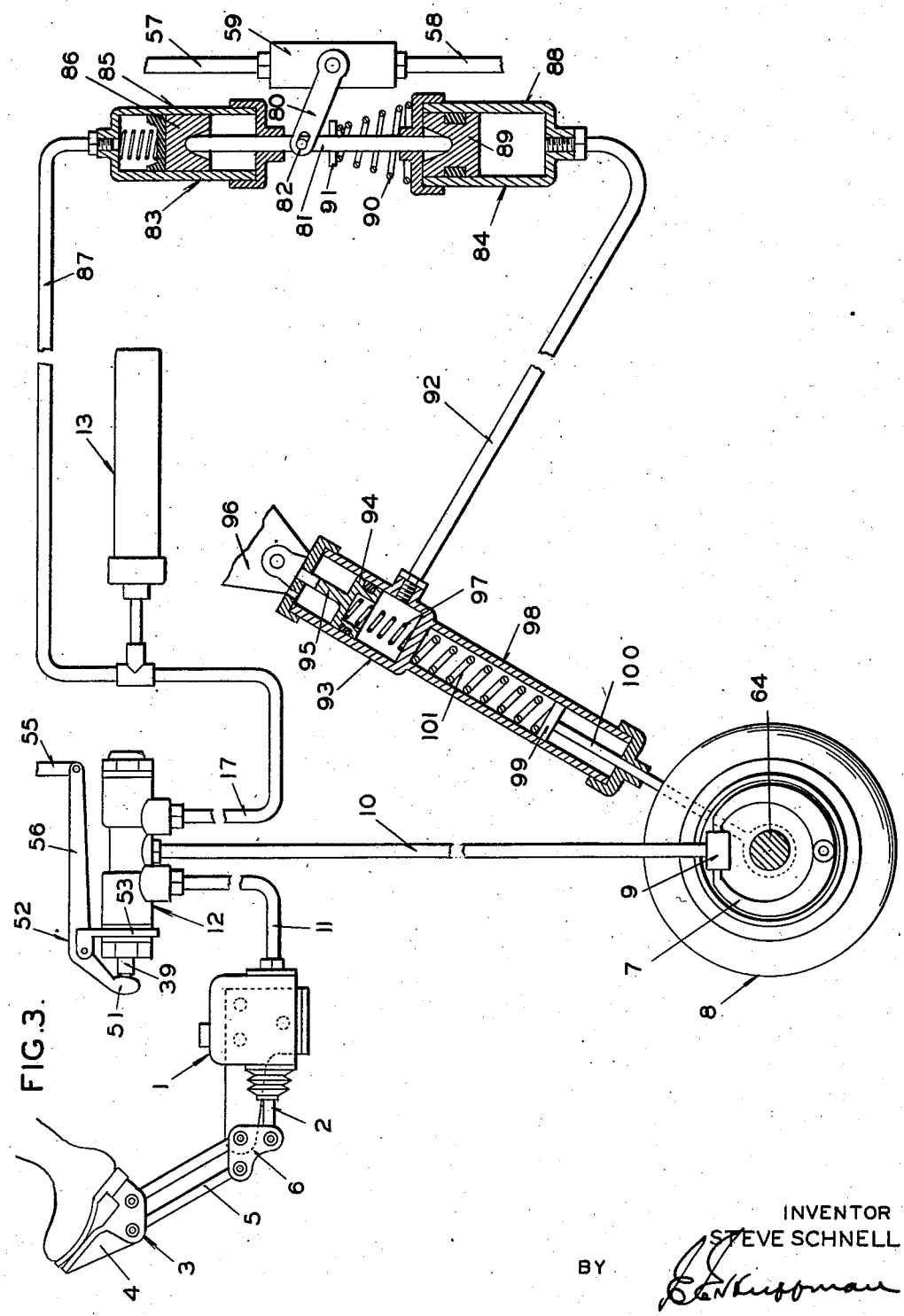

Patented May 2, 1944

2,347,847

UNITED STATES PATENT OFFICE 2,347,847

FLUID PRESSURE CONTROL SYSTEM

Steve Schnell, Kirkwood, Mo., assignor to Wagner Electric Corporation, St. Louis, Mo., a corporation of Delaware Application January 14, 1942, Serial No. 426,698

16 Claims. (Cl. 244—102)

My invention relates to fluid pressure control systems and more particularly to such a system for controlling parts of an airplane.

One of the objects of my invention is to provide improved fluid pressure operated means for controlling the brakes and the operation of the landing gear retracting mechanism of an airplane.

Another object of my invention is to provide fluid pressure operated means for automatically controlling the operation of the landing gear retracting mechanism of an airplane when the parking brake control mechanism of the fluid pressure actuated braking system is operated during flight of the airplane.

Still another object of my invention is to provide a coordinated control system for the brakes and the landing gear mechanism of an airplane so that the pilot can properly operate the landing gear by the control elements of the brakes.

Other objects of my invention will become apparent from the following description taken in connection with the accompanying drawings in which Figure 1 is a schematic view of an airplane control system embodying my invention, parts being shown in section; Figure 2 is a sectional view of the control valve mechanism; and Figure 3 is a schematic view of a similar system showing a different control arrangement for the landing gear mechanism.

Referring to Figures 1 and 2 in detail, numeral I indicates a pressure producing device in the form of a hydraulic master cylinder of wellknown construction. The piston (not shown) of this master cylinder is actuated by a piston rod 2 and the foot-operated control mechanism 3, said mechanism also permitting the controlling of other parts of the airplane by the foot such as the rudder. The master cylinder is operated by pressing the toe end of treadle 4 forwardly to thereby actuate the piston rod by means of the link 5 and bellcrank lever 6. The master cylinder is adapted to control the brake 7 on one of the landing wheels 8 of the airplane. The brake is actuated by a fluid motor 9, said fluid motor being connected to the master cylinder by conduits 10 and 11 which have associated therewith a control valve mechanism generally indicated by the numeral 12, whereby the brake may be held applied without the necessity of maintaining the master cylinder in an applied condition. The fluid pressure brake actuating system and the control valve mechanism also have associated therewith a pressure maintainer 13 comprising a cylinder 14 in which is a piston 15 backed by a strong spring 16. This pressure maintainer is brought into operation only when the control valve mechanism is operated to cause the brakes to be held applied and the purpose thereof is to maintain the trapped fluid under pressure for an indefinite period, notwithstanding that contraction of the fluid may occur due to decrease in temperature. This maintainer is connected to the control valve mechanism by a conduit 17. The other landing wheel of the airplane (not shown) is also provided with a brake and associated therewith is a duplicate fluid pressure actuating system also not shown.

The control valve mechanism 12 is shown in section in Figure 2 and comprises a casing 18 having a through-bore 19 formed with enlarged threaded ends 20 and 21 whereby shoulders 22 and 23 are provided. The threaded end 20 is closed by a threaded cylindrical plug 24 and the threaded end 21 is closed by a threaded plug 25, the internal diameters of said plugs corresponding to the central part of bore 19. The inner end of plug 24 holds and annular washer 26 between it and shoulder 22 and the inner end of plug 25 holds a like annular washer 27 between it and shoulder 23 to thus provide spaced apart abutments.

Associated with the inner side of washer 26 is an annular washer 28 forming a wall for a packing cup 29 and associated with the inner side of washer 27 is an annular washer 30 forming a wall for a packing cup 31. The lips of the packing cups face each other and are held against their respective walls by an interposed spring 32. The cups 29 and 31, together with the central part of bore 19, form a central chamber 33 which is connected by a passage 34 to conduit 10 leading to fluid motors 9. On opposite sides of this central chamber are end chambers 35 and 36, chamber 35 being in plug 24 and end chamber 36 being in plug 25. A passage 37 connects the chamber 35 to conduit 11 leading from the master cylinder and a passage 38 connects the chamber 36 to conduit 17 leading to maintainer 13.

Positioned in chambers 33, 35, and 36 is a rod 39 extending to the exterior of the casing through a packed opening 40 in plug 24. In order that the rod may extend through the packing cups, cup 29 is provided with a tapered or conical aperture 41 and cup 31 is provided with a tapered or conical aperture 42, both of said apertures having their surfaces converging toward chamber 33. The central part of the rod is of reduced diameter and between this portion and the end portions of the rod are conical portions 43 and 44 for cooperation, respectively, with the conical apertures 41 and 42. The conical portions 43 and 44 are spaced apart a greater distance than the conical apertures so that only one of the conical portions can engage its cup cooperating surface at one time.

The end of rod 39 which extends into chamber 36 carries a piston 45 and associated therewith is a packing cup 46. A spring 47 is interposed between the end of the piston and the end of plug 25 and normally biases the rod to a position where the conical portion 44 engages the surface of aperture 42 and the conical portion 43 is disengaged from the surface of aperture 41.

In chamber 35 there is positioned a piston 48 which is loosely mounted on rod 39. Associated with this piston is a packing 49. In order that the piston may be moved from its normal position when it abuts the closed end of plug 24, there is provided on the rod a shoulder 50, said shoulder abutting the end of the plug and determining the extent of movement of the rod to the left as shown in the figure. This shoulder only engages piston 48 after a predetermined movement of the rod to the right, said predetermined movement being less than that necessary to place the conical portion 43 of the rod in engagement with the conical surface of aperture 41. The end of the rod which extends out of plug 24 is adapted to be engaged by an arm 51 of a bellcrank lever 52, said lever being pivoted on a bracket 53 by means of a pin 54. This bracket is secured to the casing by being clamped between the casing and plug 24. The bellcrank lever is operated to move the rod to the right, as viewed in the figure, by actuating a link 55 pivotally connected to the other arm 56 of the bellcrank lever.

When the parts of the control valve mechanism are in the positions shown, it is seen that the maintainer is cut off from the fluid motor and the master cylinder but that free two-way communication between the master cylinder and the fluid motor is permitted. Under these conditions the brake may be applied and released at will by proper toe operation of treadle 4. The spring 47 maintains the valve rod 39 in the position shown and regardless of the fluid pressure developed, rod 39 will not be moved from this position due to the fact that the forces acting on the rod by fluid pressure are balanced.

When it is desired to maintain the brake applied, the master cylinder is first applied to place fluid under pressure in the brake actuating fluid motor 9. Next, rod 55 and the bellcrank lever 52 are opened to cause the valve rod 39 to be moved to the right against the action of spring 47. This will move the conical portion 44 away from the conical aperture 42 and admit fluid pressure into chamber 30 which will then act upon piston 45 and quickly move the rod to the right. Initial movement of rod 39 does not move piston 48 but this piston is subsequently picked up by the shoulder 50 as rod 39 approaches its extreme movement to the right and just before the conical portion 43 engages the conical aperture 41. The fluid pressure in the brake actuating fluid motor 9 will be trapped when the conical portion 43 engages aperture 41 and thus prevent the fluid under pressure from returning to the master cylinder. The master cylinder can now be released without releasing the brake. Also, to hold the brake applied, it is not necessary to continue to hold the bellcrank lever in the position to which it was moved to operate rod 39 to the right since fluid pressure will be effective on piston 45 to maintain said rod in its right-hand position. When fluid under pressure is admitted to chamber 30 by the unseating of the conical portion 44, this fluid under pressure also enters the maintainer 13 and causes piston 15 to compress the strong spring 16. The spring then becomes effective to apply a force to the trapped fluid and notwithstanding said fluid may contract due to a decrease in temperature, the trapped fluid will be maintained under pressure and the brake continued to be held applied without any operation of the master cylinder.

When it is desired to release the brake which is held applied by the trapped fluid under pressure, all that need be done is to operate the master cylinder to again develop fluid under pressure. This developed fluid under pressure will be effective in chamber 35 and since piston 48 is now in engagement with the shoulder 50, the fluid under pressure, as soon as it is of sufficient value, will move the piston 48 and rod 39 to the left and cause the conical portion 43 to be unseated from the conical aperture 41. As soon as this unseating takes place, spring 47 becomes effective to move rod 39 to the left and to its position shown in Figure 2. When the master cylinder is released, the trapped fluid under pressure will then return to the master cylinder. Any fluid under pressure which remains in maintainer 13 and chamber 36 will return to the master cylinder by either slipping past the periphery of the cup 31 or between the conical portion 44 and aperture 42 by the movement of said cup against the spring 32 so that the surface of the conical aperture 42 is slightly disengaged from the conical portion 44 of the rod. It is seen that in releasing the trapped fluid there is no necessity in any way for operating the bellcrank lever 52.

The landing wheels 8 of the airplane are mounted on the usual retracting landing gear mechanism whereby they may be retracted into the body of the plane when the plane is in flight. This retracting mechanism is of well-known construction and is not shown as it is not a part of applicant's invention. The operation of the landing gear mechanism is controlled by fluid under pressure from a suitable fluid pressure source on the airplane. The connection between this source and the fluid pressure operated actuating means of the landing gear mechanism embodies conduits and these conduits are indicated by the reference numerals 57 and 58 between which is a valve mechanism 59. The conduit 57 leads from the fluid pressure source and the conduit 58 is connected to the fluid pressure actuated means of the landing gear mechanism as indicated in Figure 1. The valve 59 is of known construction and when it is in an open position, fluid pressure from the source will be admitted to the fluid actuated retracting mechanism to thereby cause the wheels of the landing gear to be retracted. When the valve 59 is in closed position, the landing gear and wheels will be caused to be moved down into their positions for landing the airplane. The valve 59 is adapted to be controlled by a solenoid 60 and this solenoid when energized opens the valve and when not energized permits the closing of the valve. Thus it is seen that to retract the landing gear it is necessary to energize this solenoid.

Associated with the landing gear mechanism for each wheel is a cylinder 61 fixed to a part 62 of the landing gear mechanism. Extending through this cylinder is a rod 63, the lower end of which is connected to the hub 64 of the landing wheel. Within the cylinder the rod is provided with a piston 65 and interposed between this piston and the upper end of the cylinder is a spring 66. This spring, when wheel 8 is off the ground, biases the piston 65 against the lower end of the cylinder. When the airplane is on the ground the weight of the plane forces the cylinder down and compresses spring 66, thus causing a relative movement between the rod and the cylinder. The positions of the parts when the airplane is on the ground are as shown in Figure 1.

The upper end of rod 63 projects out of the upper end of the cylinder and carried by this end is a contact element 67 of a switch 68. The other contact element 69 of the switch is carried by the upper end of the cylinder. The switch will be in open position when the airplane is on the ground as shown in Figure 1. When the airplane is off the ground and the weight of the plane is no longer effective, spring 66 will move rod 63 downwardly relative to the cylinder and cause the closing of the contacts of switch 68.

The contact element 69 of switch 68 is connected by an electrical conductor 70 to one terminal 71 of solenoid 60. The other terminal 72 is connected by a conductor 73 to a source of current such as the battery 74. The movable contact element 67 of switch 68 is connected by an electrical conductor 75 to one terminal 76 of a fluid pressure operated switch 77, the other terminal 78 of said switch being connected by an electrical conductor 79 to the battery, thus completing the circuit.

The fluid pressure operated switch 77 is connected in the fluid conduit 17 which connects maintainer 13 to the control valve mechanism 12 already described. The switch 77 is closed whenever fluid under pressure is in maintainer 13, this condition, as previously noted, being present whenever the brakes are caused to be held applied by operation of the control valve mechanism 12. When the trapped fluid under pressure is released by the control valve mechanism, the fluid pressure operated switch 77 will be opened.

Switches 67 and 77 and the electrical circuit are duplicated as to the brake actuated system for the other landing wheel and the portion of the landing gear for said wheel. This other circuit (not shown) is also connected to the solenoid 60.

Referring to the operation, the functioning of the single braking system shown only will be described, it being understood that the system associated with the brake of the other landing wheel will be operated in a like manner. Let it first be assumed that the airplane is on the ground with the wheels and the landing gear mechanism in the down position. Under these conditions switch 68 will be open. If it is now desired to apply the brake and maintain it applied, the ball-crank lever 52 will be operated after the master cylinder has placed fluid under pressure in the fluid motor of the brake as a result of the toe actuation of treadle 4. Fluid pressure in the brake will thus be maintained as a result of the conditioning of the control valve in a manner already described and the operator may then remove his foot from treadle 4 and release the bellcrank lever, thus leaving the airplane parked with the brake applied. When the control mechanism is operated to trap fluid in a fluid motor and maintain the brake applied, the pressure maintainer is connected to the fluid motor and fluid under pressure is effective in conduit 17 and the maintainer. This fluid pressure causes a closing of the fluid pressure operated switch 77. Notwithstanding the closing of this switch, however, the electrical circuit is not closed due to the fact that the switch 68 is open because of the fact that the airplane is on the ground. Therefore, solenoid 60 will not be energized.

If it is now desired to release the brake preparatory to placing the airplane in flight, the pilot merely causes the master cylinder to again develop pressure as a result of toe operation of treadle 4. This will release the brake and also the fluid pressure in conduit 17 and in maintainer 13. When the master cylinder is again placed in inoperative condition, the fluid pressure operated switch 77 will then be open. As soon as the pilot has caused the plane to take off, the weight will be removed from the wheels of the airplane and as a result thereof, spring 66 will become effective to close the switch 68. The electrical circuit, however, will not become closed under these conditions due to the fact that the fluid pressure operated switch is in open condition. When the plane is off the ground and it is desired to stop the spinning of the wheels and retract the landing gear and wheels into the body of the airplane, the master cylinder will be operated to apply the brake. Next the operator will actuate the bellcrank lever 52 to cause a trapping of the fluid pressure in the fluid motor 9, thus permitting the master cylinder to be released with the release of the brake. Substantially simultaneously with the trapping of the fluid pressure, the maintainer 13 will be connected to the fluid motor and consequently, fluid under pressure will be effective to close the pressure operated switch 77. This will now cause closing of the electrical circuit and energization of solenoid 60. The solenoid will now open valve 59 and cause the fluid pressure from the source to flow from conduit 57 to conduit 58 leading to the fluid actuated retracting mechanism and cause this mechanism to be so operated that the landing gear and wheels will be pulled up into the body of the plane.

This retracted position of the wheels will be maintained until it is again desired to land the airplane. When such an occasion arises, the operator need only actuate the master cylinder to again cause it to develop pressure. This developed pressure, when of sufficient value, will automatically cause rod 39 of the control valve mechanism to be returned to its position shown in Figure 2 wherein the fluid motors of the brakes will be again connected to the master cylinder. The master cylinder is then released and the trapped fluid pressure will be returned to the master cylinder as will also the fluid under pressure in the maintainer. The release of the fluid under pressure in the maintainer will permit the fluid pressure operated switch 77 to be opened and break the electrical circuit. The solenoid 60 will no longer be energized and as a result thereof, valve 59 will be closed. The closing of the valve will result in the landing gear and the wheels assuming their down positions for landing the airplane.

As soon as the plane reaches the ground, switch 68 will be opened in the manner already described as a result of the weight of the airplane acting on the wheels. The pilot may now operate the brakes to bring the airplane to stopped position and then, if desired, maintain the brakes applied by operating the bellcrank lever 52. This will then permit removal of the pilot's foot from treadle 4 without releasing the brakes. The solenoid will not be energized due to the open position of switch 68.

It is seen from the foregoing description of my improved airplane control system and its operation that there is provided means for so controlling the fluid pressure actuating means for the landing gear mechanism of the airplane that the landing gear may be efficiently retracted and let down by the pilot by merely controlling the braking mechanisms for the wheels which has embodied therein means for maintaining the brakes applied for parking purposes. There is no necessity for any separate controls for the controlling of the landing gear mechanism. The retracting of the landing gear and letting it down is all accomplished by controlling the braking systems and in a manner which will not in any way cause confusion in the pilot's mind. If the pilot is ready to take off, it will be necessary for him to release the brakes and to leave them released until the plane is in the air. To retract the landing gear after the airplane is in the air, it is only necessary to re-apply the brakes and set the parking mechanism. When it is desired to again let the wheels down for landing purposes, the pilot need only actuate the master cylinder and release it, thus automatically releasing the trapped fluid pressure and simultaneously causing the control mechanism of the landing gear mechanism to be so operated as to let the wheels come down.

In the control system shown in Figure 3 the electrical means for controlling the operation of valve 59 of the fluid pressure actuated mechanism for the retracting and releasing of the landing gear is replaced by a fluid pressure system. The master cylinder, brake control valve mechanism, and pressure maintainer remain the same and are designated by the same reference characters as employed in the description of the apparatus shown in Figures 1 and 2. The valve 59 is controlled by a lever 80 which is connected to a rod 81 by means of a pin and slot connection 82. This rod is controlled by two fluid motors 83 and 84, the motor 83 comprising a cylinder 85 and a piston 86. The forward end of cylinder 85 is connected by a conduit 87 to conduit 17 leading to the pressure maintainer 13. The fluid motor 84 comprises a cylinder 88 and a piston 89. The rod 81 is adapted to be engaged at opposite ends by the pistons 86 and 89 of the two fluid motors. A spring 90 is interposed between cylinder 88 and a pin 91 carried by rod 81 in order to normally bias lever 80 of valve 59 to a position where valve 59 is closed.

The fluid motor 84 has its cylinder connected by a conduit 92 to a cylinder 93, said cylinder 93 being associated with the retracting landing gear mechanism. Within this cylinder is a piston 94 which has a piston rod 95 extending out of the upper end of cylinder 93 and connected to a part 96 of the landing gear retracting mechanism. The spring 97 is interposed between the piston 94 and the forward end of the cylinder to cause relative movement between the piston and cylinder when permitted. Integral with cylinder 93 is a second cylinder 98 in which is a piston 99 carried on the end of rod 100 which extends out of the end of the cylinder and is secured to hub 64 of the landing wheel 8. Between the piston 99 and the upper end of cylinder 98 is a spring 101.

When the airplane is on the ground, the weight of the airplane will cause piston 94 to be in the position shown due to the fact that the weight of the airplane has caused spring 100 to be compressed and cylinder 93 forced upwardly relative to piston 94. Under these conditions, piston 94 will displace the fluid in cylinder 93 and force it into fluid motor 84 to thus cause piston 89 to be held in the position shown wherein lever 80 will maintain the valve 59 closed. If it is desired to apply the brake and maintain it applied for parking the airplane, this is accomplished by an application of the brake and an operation of the bellcrank lever 52. Fluid under pressure will become effective in conduits 17 and 87 but this fluid pressure will be insufficient to cause piston 86 of fluid motor 83 to be moved from its position shown due to the fluid pressure in fluid motor 84 and also the action of spring 90. Thus valve 59 will not be opened and, therefore, the landing gear mechanism will remain down.

When the pilot desires to take off, the brakes will be released by an operation of the master cylinder and then a subsequent release thereof. After the airplane has taken off, the brake will then again be applied to stop spinning of the wheels and then held in applied condition by operation of the bellcrank lever 52 and the control valve mechanism 12. Since the wheels are now removed from the ground, the weight of the airplane is no longer effective on the wheels and spring 97 can be effective to position piston 94 in the upper end of cylinder 93, thus releasing the fluid under pressure in the fluid motor 84. When the brake is applied and held in applied condition by operation of the bellcrank lever 52, the fluid under pressure is effective in conduit 87 and in fluid motor 83, thus moving piston 86 and compressing spring 90 which is the only resistance being offered. Lever 80 will thus be operated so that valve 59 is opened. The opening of this valve will permit the fluid actuated mechanism of the landing gear to be operated and retract it and the wheels into the body of the airplane.

When it is desired to let down the landing wheels, the master cylinder will be operated to cause release of the trapped fluid. This will also release the fluid pressure in maintainer 13, conduit 87 and the fluid motor 83. Spring 90 will then become effective to move lever 80 to the position shown in Figure 3, thereby closing valve 59. Upon closing of this valve the landing gear will be let down. As soon as the airplane reaches the ground, the weight of the plane on the wheels will again cause fluid pressure to be effective on piston 89 as a result of relative movement between piston 94 and cylinder 93. This will maintain valve 59 in closed position, notwithstanding the fact that the brakes may be held applied for parking purposes after the airplane has been brought to a stop.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In control means, a source of fluid pressure, a fluid motor connected to the source and capable of operating a device, means for controlling the development and release of fluid under pressure in the motor, valve means operable at will independently of the controlling means for trapping fluid under pressure in the motor and maintaining it therein without the necessity of continued pressure from the source as controlled by said controlling means, means for controlling a device separate from the device operated by the fluid motor and comprising a pressure-operated control member, and valve means operable simultaneously with the first valve means for admitting the trapped fluid under pressure to operate said pressure-operated control member.

2. In a control system for airplanes having wheels mounted on a retractile landing gear, a wheel brake, a fluid motor for actuating the brake, a source of fluid pressure connected to the fluid motor, means for controlling the development and release of fluid pressure in the motor, valve means operable at will independently of the controlling means for trapping fluid under pressure in the fluid motor to maintain the brake applied without the necessity of continued pressure from the source as controlled by said controlling means, means for controlling the operation of the landing gear and comprising a fluid pressure operated member, and means for admitting fluid under pressure to operate said last named member only when the valve means is operated to trap fluid pressure in the motor.

3. In a control system for airplanes, a fluid motor for actuating a device, a source of fluid pressure connected to the fluid motor, means for controlling the development and release of fluid pressure in the motor, means operable independently of said controlling means for trapping fluid pressure in the motor to maintain the fluid motor in an actuated condition without the necessity of continued pressure from the source as controlled by said controlling means, control means for controlling another device on the airplane, means operable when the airplane is in flight and fluid under pressure is trapped in the motor for causing said control means to be in a position where the device controlled thereby is operated, and means causing said last named means to be inoperative when the airplane is on the ground notwithstanding fluid under pressure is trapped in the fluid motor.

4. In a control system for airplanes, a fluid motor for actuating a device, a source of fluid pressure connected to the fluid motor, means for controlling the development and release of fluid pressure in the motor, valve means operable at will independently of the controlling means for trapping fluid pressure in the motor to maintain the fluid motor in an actuated condition without the necessity of continued pressure from the source as controlled by said controlling means, control means for controlling another device on the airplane, means operable when the airplane is in flight and fluid under pressure is trapped in the motor for causing said control means to be in a position where the device controlled thereby is operated, and means for causing said valve means to be opened to release the trapped fluid by re-application of pressure from the source.

5. In a control means for airplanes having wheels mounted on a retractile landing gear, a wheel brake, operator-controlled means for applying the brake, means operable independently of the operator-controlled means for maintaining the brake applied without operator effort after said operator-controlled means has been operated, a control member for the retracting means of the landing gear, and means operable when the airplane is in flight and the brake is applied and maintained applied for so controlling said control member that the landing gear will be retracted.

6. In a control means for airplanes having wheels mounted on a retractile landing gear, a wheel brake, operator-controlled means for applying the brake, means for maintaining the brake applied without operator effort, a control member for the retracting means of the landing gear, means operable when the airplane is in flight and the brake is applied and maintained applied for so controlling said control member that the landing gear will be retracted, means for so controlling the last named means that the control member will permit release of the landing gear to landing position when the maintaining means releases the brake, and means for releasing the maintaining means.

7. In a control means for airplanes having wheels mounted on a retractile gear, a wheel brake, operator-controlled means for applying the brake, means for maintaining the brake applied without operator effort, a control member for the retracting means of the landing gear, means operable when the airplane is in flight and the brake is applied and maintained applied for so controlling said control member that the landing gear will be retracted, means for so controlling the last named means that the control member will permit release of the landing gear to landing position when the maintaining means releases the brake, means for releasing the maintaining means, and means operable when the airplane is on the ground for disabling the means for controlling the control member to thereby prevent the landing gear from being retracted notwithstanding the brake is maintained applied.

8. In a control system for airplanes having wheels mounted on a retractile landing gear, a fluid pressure actuated brake for a wheel, a source of fluid pressure connected to the brake, means for trapping fluid under pressure in the fluid pressure actuated brake to thereby maintain it applied without the necessity of continued pressure from the source, control means for the retractile landing gear, and means operative when the airplane is in flight and fluid under pressure is trapped to maintain the brake applied for so controlling the control means for the landing gear that the gear will be caused to be retracted.

9. In a control system for airplanes having wheels mounted on a retractile landing gear, a fluid pressure actuated brake for a wheel, a source of fluid pressure connected to the brake, means for trapping fluid under pressure in the fluid pressure actuated brake to thereby maintain it applied without the necessity of continued pressure from the source, control means for the retractile landing gear, means operative when the airplane is in flight and fluid under pressure is trapped to maintain the brake applied for so controlling the control means for the landing gear that the gear will be caused to be retracted, and means for causing said last named means to be inoperative when the airplane is on the ground notwithstanding fluid under pressure may be trapped to maintain the brake applied.

10. In a control system for airplanes having wheels mounted on a retractile landing gear, a wheel brake, a fluid motor for the brake, a source of fluid pressure connected to the fluid motor, means for trapping fluid pressure in the motor to maintain the brake applied without the necessity of continued pressure from the source, control means for the retractile landing gear, and means operable when the airplane is in flight and fluid is trapped for causing the control means to be in a position where the landing gear will be retracted, said last named means embodying means for causing the control means to be in a position where the landing gear will be released to landing position when the trapped fluid pressure is released with the airplane still in flight.

11. In a control system for airplanes having wheels mounted on a retractile landing gear, a wheel brake, a fluid motor for the brake, a source of fluid pressure connected to the fluid motor, means for trapping fluid pressure in the motor to maintain the brake applied without the necessity of continued pressure from the source, control means for the retractile landing gear, means operable when the airplane is in flight and fluid is trapped for causing the control means to be in a position where the landing gear will be retracted, said last named means embodying means for causing the control means to be in a position where the landing gear will be released to landing position when the trapped fluid pressure is released with the airplane still in flight, and means for releasing the trapped fluid under pressure.

12. In a control system for airplanes having wheels mounted on a retractile landing gear, a wheel brake, means for applying the brake by an operator, means operable at will for maintaining the brake applied without operator effort, means for retracting the landing gear comprising a control member, means comprising a solenoid and an electrical circuit for controlling said control member, a switch in said circuit connected to be moved to closed position only when the brake is maintained applied, and a second switch in said circuit so associated with the airplane as to be open when the airplane is on the ground and closed when the airplane is in flight.

13. In a control system for airplanes having wheels mounted on a retractile landing gear, a wheel brake, a fluid motor for actuating the brake, a source of fluid pressure connected to the fluid motor, valve means operable at will for trapping fluid under pressure in the fluid motor of the brake, means comprising a control member for controlling the operation of the landing gear, a solenoid for said control member, an electrical circuit including two switches, means for closing one switch only when fluid under pressure is trapped in the fluid motor, and means for closing the other switch when the airplane is in flight, said solenoid when energized by the closing of the two switches causing the control member to be in a position where the landing gear is caused to be retracted.

14. In a control system for airplanes having wheels mounted on a retractile landing gear, a wheel brake, a fluid motor for actuating the brake, a source of fluid pressure connected to the fluid motor, valve means operable at will for trapping fluid under pressure in the fluid motor of the brake, means comprising a control member for controlling the operation of the landing gear, a solenoid for said control member, an electrical circuit including two switches, fluid pressure actuated means for closing one switch when fluid under pressure is trapped in the fluid motor, and means for closing the other switch when the airplane is in flight and for positively opening it by relative movement between the body of the plane and a wheel when the airplane is on the ground, said solenoid when energized by the closing of the two switches placing the control member in a position where the landing gear is caused to be retracted and when de-energized permitting release of the landing gear to a landing position.

15. In a control system for airplanes having wheels mounted on a retractile landing gear, a wheel brake, a fluid motor for actuating the brake, a source of pressure connected to the fluid motor, valve means operable at will for trapping fluid under pressure in the fluid motor to maintain the brake applied without the necessity of continued pressure from the source, means comprising a control member for controlling the operation of the landing gear, fluid pressure actuated means for moving said control member to a position where the landing gear will be retracted, means for admitting fluid under pressure to said last named means only when the valve means is operated to trap fluid under pressure in the motor, and means operable only when the airplane is on the ground for preventing said fluid pressure actuated means from being operated so that the control member can cause retracting of the landing gear.

16. In a control system for airplanes having wheels mounted on a retractile landing gear, a wheel brake, a fluid motor for actuating the brake, a source of pressure connected to the fluid motor, valve means operable at will for trapping fluid under pressure in the fluid motor to maintain the brake applied without the necessity of continued pressure from the source, means comprising a control member for controlling the operation of the landing gear, fluid pressure actuated means for moving said control member to a position where the landing gear will be retracted, means for admitting fluid under pressure to said last named means only when the valve means is operated to trap fluid under pressure in the motor, means operable only when the airplane is on the ground for preventing said fluid pressure actuated means from being operated so that the control member can cause retracting of the landing gear, said last named means comprising a fluid motor connected to oppose the movement of the fluid pressure actuated means, and a compressor connected to apply fluid under pressure to said last named motor, said compressor having relatively movable parts which are actuated to develop fluid pressure by relative movement between the body of the plane and a wheel when the airplane is on the ground.

STEVE SCHNELL.